United States Patent [19]

Leir et al.

[11] Patent Number: 4,734,458

[45] Date of Patent: Mar. 29, 1988

[54] ADHESIVE COMPOSITIONS CONTAINING IONENE ELASTOMERS

[75] Inventors: Charles M. Leir; John E. Stark, both of St. Paul, Minn.

[73] Assignee: Minnesota Mining and Manufacturing Company, St. Paul, Minn.

[21] Appl. No.: 918,579

[22] Filed: Nov. 24, 1986

Related U.S. Application Data

[62] Division of Ser. No. 801,281, Nov. 25, 1985, Pat. No. 4,677,182.

[51] Int. Cl.$^4$ ................................................ C08F 8/30
[52] U.S. Cl. ...................................... 525/149; 525/109
[58] Field of Search ................................. 525/149, 109

[56] References Cited

U.S. PATENT DOCUMENTS

| | | | |
|---|---|---|---|
| 3,819,552 | 6/1974 | Glanville et al. | 525/149 |
| 3,898,253 | 8/1975 | Buckler et al. | |
| 3,904,580 | 9/1975 | Lasis et al. | |
| 3,969,330 | 7/1976 | Lasis et al. | |
| 3,976,606 | 8/1976 | Gobaan | 525/149 |
| 4,070,340 | 1/1978 | Lasis et al. | |
| 4,127,545 | 11/1978 | Callan et al. | 525/149 |
| 4,256,857 | 3/1981 | Buckler et al. | |

OTHER PUBLICATIONS

J. Am. Chem. Soc., 57, 1137 (1935) Gibbs and Marvel.
Rubber World, Apr. 1968, p. 46, Dolezal et al.
Angew, Chem. Int. Ed. Engl., 9, 40 (1970).
Elastomers, Dec. 1977, p. 32.
IUPAC Sixth Int. Symposium on Cationic Polymerization and Related Processes, Abstract, Ghent, Belgium, Aug. 30 to Sep. 2, 1983.
Kjojiya (Makrom, Chem. Rapid Comm., 2, 417 (1981).

*Primary Examiner*—Jacob Ziegler
*Attorney, Agent, or Firm*—Donald M. Sell; James A. Smith; Richard Francis

[57] ABSTRACT

Ionene elastomers are prepared by reaction of polymeric diamines and certain dihalide linking agents. These elastomers have utility in coating compositions, adhesive compositions, and in the fabrication of elastomeric articles. Certain novel dihalide linking agents are also claimed.

2 Claims, No Drawings

ADHESIVE COMPOSITIONS CONTAINING IONENE ELASTOMERS

This is a division of application Ser. No. 801,281, filed Nov. 25, 1985, now U.S. Pat. No. 4,677,182.

DESCRIPTION

1. Technical Field

This invention relates to adhesive compositions containing ionene elastomers, sheet materials coated with such adhesive compositions, and to certain novel dibenzyl halide compounds useful in the preparation of the same.

2. Background Art

Polymers which include ions as an integral part of the polymeric chain are known as ionene polymers. Although a variety of structural types of ionene polymers are possible, by far the most common are polymeric quaternary ammonium salts. The first examples of such ionene polymers, as reported by Gibbs and Marvel in J. Am. Chem. Soc. 57, 1137 (1935), were prepared by reaction of low molecular weight diamines with low molecular weight alkyl dibromides, producing a polymer as a crystalline solid with a high ionic content which was insoluble in most organic solvents and very soluble in water. Numerous examples of this type of ionene polymer have subsequently been described in the scientific and patent literature, citing among other features their utility as corrosion inhibitors, wet and dry strength additives, and antimicrobial agents.

It was observed that by substantially reducing the ionic content of the ionene polymer by increasing the molecular weight of the oligomeric fragments between quaternary ammonium links with a polymer having a $T_g$ below room temperature, an elastomeric ionene polymer is produced. For example, Dolezal et al. (Rubber World, April 1968, page 46) studied the reaction of 4–6,000 MW polyisobutylene dibromides with various organic tertiary amines. The resulting ionenes were elastomeric but very weak. Strength was developed in such elastomers only after being crosslinked with multifunctional amines. Dieterich et.al. have reviewed polyester polyurethane ionenes [Angew. Chem. Int. Ed. Engl., 9, 40 (1970)] and have investigated the effect of ionic content on elastomeric properties. Khojiya [Makrom. Chem. Rapid Comm. 2, 417 (1981)] discloses an ionene prepared from a polytetramethylene oxide diamine of 1000 molecular weight with 1,4-bis(chloromethyl)benzene as linking agent to produce a weak elastomer with a tensile strength of 1370 kPa (200 psi) and elongation at break of 510%. Better physical properties were reported later (IUPAC Sixth Int. Symposium on Cationic Polymerization and Related Processes. Abstract, Ghent, Belgium, Aug. 30–Sept. 2, 1983). Using 1,4-bis(chloromethyl)benzene again, but with a polytetramethylene oxide diamine of 4,400 molecular weight, a film was made with 27,000 kPa tensile strength (3900 psi) and 1000% elongation at break. However, such elastomers exhibited high permanent set when extended to 500% elongation.

A series of patents by Buckler et al. describe the quaternization of pendant tertiary amines with difunctional halides in a number of styrene-butadiene (SBR) gum rubbers (U.S. Pat. No. 3,969,330; U.S. Pat. No. 4,070,340), and of pendant halides in a halobutyl gum with difunctional amines (U.S. Pat. No. 3,898,253), as a means of providing improved green strength in the manufacture of tires and inner tubes. Although these elastomers are not true ionenes in the ordinary sense of the definition, the authors discovered that such crosslinks behaved as if they were labile. Under the action of mechanical shearing and heat, the Mooney viscosity of the cured elastomers was significantly reduced and the rubbers became readily millable. Furthermore, upon standing, the elastomeric properties were completely recovered and this was attributed to the reversibility of the quaternary ammonium links (*Elastomerics*, December 1977, page 32). These results are also consistent with another, perhaps more likely explanation; namely, that milling of the cured rubber causes rupture of hydrocarbon bonds which reduces the Mooney viscosity but at the same time leaves the quaternary ammonium bonds intact. These ions would then be left as pendant groups along the polymer chains. Upon standing, these ions aggregate into clusters which act as physical crosslinks to re-establish green strength. Indeed, the authors have demonstrated that such reversible elastomeric properties can be developed without chemical crosslinking in a halobutyl rubber by simply quaternizing pendant alkyl bromides with monomeric tertiary amines (U.S Pat. No. 4,256,857).

U.S. Pat. No. 3,904,580 appears to be the only disclosure of the preparation of an elastomer which undergoes reversible quaternization. This patent describes a styrene butadiene copolymer with pendant amines cured with 1,4-bis(chloromethyl)benzene linking agent to provide a crosslinked quaternary ammonium elastomer which is capable of reversal of the quaternization when heated to 175° C. This linking agent is, however, slow to react with the pendant amines. This slowness of reactivity is a common major disadvantage in most ionene elastomer preparations. Most of the other reported preparations of true ionene elastomers often require days of heating under reflux to achieve adequate degrees of polyquaternization.

SUMMARY OF THE INVENTION

The present invention provides novel ionene polymers and a method of making the same. The ionene polymers of the invention have repeating units represented by formula I, as follows:

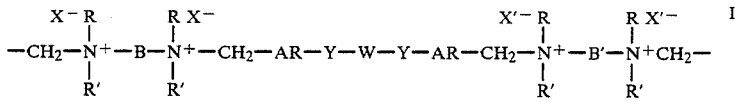

wherein

R is a lower alkyl group of 1 to 4 carbon atoms (preferably a methyl group);

R' is a lower alkyl group of 1 to 4 carbon atoms (preferably a methyl group) wherein R' may be the same as or different from R, and R' and R may be joined together with or without an additional hetero atom to form a heterocyclic ring, e.g., pyrrolidine, piperidine, or morpholine;

X is a halogen selected from the group consisting of Cl, Br, and I;

X' is a halogen selected from the group consisting of Cl, Br, and I and can be the same as or different from X;

B is a divalent polymeric moiety having a molecular weight of about 1,000 to about 50,000;

B' is a divalent polymeric moiety having a molecular weight of about 1,000 to about 50,000 and may be the same as or different from B but, if B and B' are different, at least one of B or B' has a $T_g$ of less than 20° C.;

AR is a phenylene or substituted phenylene radical;

Y is a divalent electron-donating substituent such as oxygen, nitrogen or sulfur; and W is a divalent radical selected from the group consisting of (1) $C_{2-12}$ alkylene selected from the group consisting of saturated $C_{2-12}$ alkylene $C_{2-12}$ alkylene with one double bond, $C_{2-12}$ alkylene more than one double bond, and $C_{2-12}$ alkylene with a triple bond, (2)—$(CH_2CH_2O)_2$-$CH_2CH_2$— when Y is oxygen or sulfur, and (3) carbonyl, terephthaloyl, or adipoyl when Y is nitrogen.

More specifically, the method involves reacting one or more polymeric diamine represented by formula II and/or formula III, and one or more dibenzyl halide represented by formula IV and/or formula V, as follows:

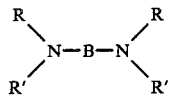     II

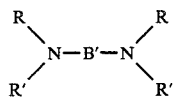     III

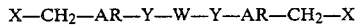     IV

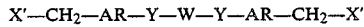     V

The elastomers of the invention depolymerize rapidly, if desired, upon heating to relatively low temperatures, e.g., 145° C. to 200° C., to give the starting diamine and dibenzyl halide as gums or syrups which may be extruded to provide coatings or hot-melt adhesive compositions, or molded to provide elastomeric articles on cooling. The temperature at which the depolymerization occurs will vary depending upon the particular halogen present in the elastomer. Elastomers wherein X represents a Cl atom will depolymerize at lower temperatures, e.g., 145° C.–160° C., than where X represents Br or I.

The gums and syrups repolymerize on standing at or near ambient temperature to provide an ionene which has substantially the same physical characteristics and properties as that before depolymerization.

The invention also claims novel dibenzyl halides wherein W is further defined as being $C_{7-12}$ alkylene.

DETAILED DESCRIPTION

In the preparation of ionene elastomers from the reaction of polymeric diamines with dihalides, the rate of polyquaternization as well as the ultimate molecular weight achieved are determined by a number of factors. The molar concentration of reactive chain ends, the polarity of the medium, the inherent nucleophilicity of the diamine, and the reactivity of the dihalide all play a role. As the molecular weight of starting diamine oligomer is increased to obtain desired elastomeric properties, and then as the reaction proceeds, the concentration of reactive chain ends necessarily diminishes, greatly reducing the overall rate and ultimate degree of polymerization. It may be necessary to compensate for this effect by increasing the reactivity of the system. It is therefore preferred to employ diamines wherein R and R' represent methyl groups, particularly if B and B' are of high molecular weight, to obtain reasonably fast reaction rates.

The segment B or B' of diamine II and/or III can be any polymer having a $T_g$ below room temperature. Suitable diamines are α, ω-bis(dimethylamino)polytetramethylene oxide, α, ω-bis(dimethylamino) polyisobutylene, α, ω-bis(dimethylamino) polyisoprene, α, ω-bis(dimethylamino) polypropylene oxide, and the like, preferably of molecular weight from about 1,000 to about 50,000. The most preferred diamine is α, ω-bis(dimethylamino) polytetramethylene oxide, and optimum polymerization rates are obtained for diamine of from about 5,000 to about 25,000 molecular weight. Combinations of one or more different diamines may be employed to prepare novel ionene block copolymer elastomers. Minor amounts of polymeric diamines having a crystalline or high $T_g$ ($T_g$ above room temperature) B or B' group may also be used. Examples of such diamines include polymeric diamines α, ω-bis(dimethylamino) polymethylmethacrylate, α, ω-bis(dimethylamino) polystyrene, α, ω-bis(dimethylamino) polyethylene oxide, and the like, preferably in the 1,000–10,000 molecular weight range, For the preparation of ionene elastomer according to the invention, diamine is treated with a stoichiometric amount of reactive dihalide either in bulk or preferably in a solvent at a temperature of from about 25° C. to about 125° C. Preferred solvents are polar and aprotic such as dimethylformamide, acetone, and ethyl acetate, with methyl ethyl ketone and tetrahydrofuran being most preferred. The reaction is stirred, preferably under reflux, until the viscosity rises sufficiently, e.g., to stop the magnetic stirrer, usually in from several minutes to as long as 24 hours depending on the structure of the dihalide employed.

In the case of the dihalide linking agents, a number of structural variations are possible which greatly increase the rate and degree of polymerization and enable the preparation of ionene elastomers with outstanding properties. Preferred dibenzyl halides are those of Formula IV and V which are substituted in the para position with electron-donating substituents Y. This has been found to enhance the reactivity of the leaving group, X (and/or X'), and thereby significantly increase the rate and degree of polymerization. The activated benzyl groups are joined by a link W of at least two and preferably four or more carbon atoms. Such compounds include 1,4-bis(p-bromomethylphenoxy) butane, N,N'-dimethyl-N,N'-bis(p-chloromethylphenyl)urea, 1,4-bis(2-methoxy-5-chloromethylphenoxy) butane, 1,6-bis(p-chloromethylphenylthio) hexane, diethylene glycol-bis(p-bromomethylphenyl) ether, N,N'-dimethyl-N,N'-bis(p-chloromethylphenyl) adipamide, and 1,4-bis(p-iodomethylphenoxy) butane.

Useful dibenzyl halides wherein W is $C_{2-6}$ alkylene are disclosed in U.S. Pat. No. 3,639,303. Dibenzyl halides wherein W is $C_{7-12}$ alkylene are novel and a part of this invention.

Of course, the substituent which exerts the greatest effect on the rate and degree of polymerization is the halide, X (and/or X'). In agreement with the well known order of reactivity of halogens toward displacement, in which I>Br>Cl, an elastomer with the highest molecular weight in the shortest reaction time was obtained using a substituted dibenzyl iodide. Nevertheless, for most ionene elastomer preparations, Br is sufficiently reactive and is generally preferred as a leaving group, since the dibenzyl bromides are more easily prepared and are much more stable than dibenzyl iodides.

Although dibenzyl chlorides were significantly slower to react with polymeric diamines than dibromides, surprisingly it was found that mixtures of chlorides with small amounts of bromides gave polymerization rates almost as fast as those of pure bromides.

The ionene elastomers of formula I are thermoplastic; when heated to a specific minimum temperature, which is determined by the substituents chosen for X, X' and Y, the quaternization reverses to regenerate amine and benzyl halide, resulting in depolymerization to lower molecular weight gums or syrups which can be fabricated. The effect of the electron-donating substituents, Y, in this reverse reaction is again one of facilitation, resulting in dequaternization occurring at lower temperatures than with unsubstituted analogs. The halide moiety, X (and/or X'), in this case is acting as a nucleophile, and the ease of dequaternization parallels the relative reactivity of halide nucleophiles, with the chloride ionenes exhibiting lower depolymerization temperatures than bromides.

Just as it was found that the combination of dibenzyl bromide with chloride gave the fast rates of polymerization characteristic of pure bromides, the same mixtures gave the low depolymerization temperatures characteristic of pure chlorides. Thus by utilizing mixtures of dibenzyl halides, it is possible to optimize the favorable characteristics of both bromides and chlorides, and to prepare ionene elastomers of high molecular weight which depolymerize at reasonably low temperatures to avoid decomposition.

In choosing a polymeric diamine and reactive dibenzyl halide to prepare a novel ionene elastomer, the preferred reactants are determined by the properties required in the intended application. Since this is a type of step growth polymerization, an important factor in achieving maximum ultimate molecular weight of any ionene is that whatever diamine is chosen have a functionality as close to 2.0 as possible. It is for this reason that $\alpha, \omega$-bis(dimethylamino)polytetramethylene oxide has been found particularly attractive as a reactant, since it is readily prepared in any desired molecular weight with excellent difunctionality by the method of Smith and Hubin (U.S. Pat. No. 3,824,219).

In the case of the dibenzyl halides, the particular application again dictates the choice. For example, if an ionene elastomer is required that has high heat stability, then a benzyl bromide or iodide such as 1,4-bis(p-bromo (or iodo)methylphenoxy) butane is preferred. If it is desired that the ionene depolymerize and flow upon heating, then either a chlorobenzyl or a mixture of chloro and bromo benzyl halides could be employed such as preferably 1,4-bis(2-methoxy-5-chloromethylphenoxy)butane alone or in combination with 1,4-bis(4-bromomethylphenoxy)butane.

The elastomers of the present invention provide suitable base materials for adhesive compositions, particularly pressure sensitive adhesive compositions. Pressure sensitive adhesive compositions may be prepared by blending the elastomers of the present invention with a suitable tackifier resin. Illustrative tackifier resins include alpha-pinene phenol tackifying resin and rosin ester tackifying resin such as that available under the trade designation "Foral" 85. Preferably, the weight ratio of tackifier resin to elastomer is in the range of about 50:100 to 150:100.

Such adhesive compositions may include other conventional additives normally included in adhesive compositions and pressure sensitive adhesive compositions. Such normal additives include stabilizers, fillers, ultraviolet light stabilizers and the like. The pressure sensitive adhesive compositions may be coated onto suitable backing materials to form adhesive coated sheet materials to provide tapes, labels, and the like. Suitable backing materials are formed of paper, plastic film such as polyester film (e.g., polyethylene terephthalate), metal foils, and the like.

This invention will be further demonstrated in the following examples, which will serve to illustrate not only the preparation of novel ionene elastomers, but also the synthesis of novel dihalide and polymeric diamine starting materials. The details of the depolymerization of these ionenes will be described, as well as some of the outstanding properties of a number of the elastomers available by the practice of this invention. Finally, the formulation of an ionene elastomer into a pressure sensitive adhesive composition will be presented.

EXAMPLE 1

Illustrating the preparation of alpha, omega-bis(dimethylamino)polytetramethylene oxide A flame-dried 500 ml, 3-necked, round-bottomed flask equipped with mechanical stirrer, reflux condenser, $N_2$ inlet, and thermometer was charged with 35 grams methylene chloride and 50 grams tetrahydrofuran (THF) previously dried over 3A molecular sieves. The solution was cooled to 0°–5° C. under dry $N_2$ with an ice-water bath. Trifluoromethane sulfonic anhydride (4.0 g) was added rapidly via syringe, and the mixture was stirred with cooling for 15 minutes. Additional THF (90 g) was added dropwise over a 15–20 minute period at such a rate that the temperature did not rise above 5° C. After addition was completed, the reaction was stirred for an additional 90 minutes at 0°–5° C.

The polymerization was terminated by pouring the viscous syrup into a rapidly stirred solution of 12 g anhydrous dimethylamine condensed in 50 ml of dry THF. After stirring at room temperature for 15 minutes, the mixture was transferred to a 500 ml, one-necked, round-bottomed flask with 150 ml toluene, and the $CH_2Cl_2$ and unreacted THF were stripped on a rotary evaporator. The residue was diluted with more toluene to a volume of 400 ml, treated with 50 ml of 25% aqueous NaOH, and stirred and heated at reflux for 10 minutes. The still warm mixture was transferred to a separatory funnel, the lower aqueous layer discarded, and the organic phase dried over $MgSO_4$ and filtered through a Buchner funnel with a filter aid layer of diatomaceous earth available under the trade designation "Super Cel". The clear, colorless solution was concentrated to dryness on a rotary evaporator to give bis(dimethylamino)-polytetramethylene oxide as a light-yellow viscous syrup in 60–65% yield. The polymer was dissolved in dry THF and stored as a 50% by weight solution. The molecular weight of the poly THF diamine is calculated from the titration of a THF-isopropyl alcohol solution with 0.1 N HCl to a bromphenol blue end point, and in this example was found to be 10,000. Higher molecular weight diamines are obtained by increasing the ratio of tetrahydrofuran to anhydride initiator, and conversely, lower ratios will give lower molecular weight oligomers. In this way, a series of poly THF diamines was prepared, ranging from 3,000 up to 27,500 MW.

EXAMPLE 2

Illustrating the preparation of alpha, omega-bis(dimethylamino) polymethyl methacrylate An initiator/catalyst solution was prepared from 1.67 g (0.0068 moles) dimethylketene 3-dimethylaminopropyl trimethylsilyl acetal and 0.20 ml of a 0.1 M solution in acetonitrile of tris (dimethylamino) sulfonium bifluoride (TASHF$_2$) in 60 ml THF (freshly distilled from potassium ketyl).

Twenty ml of this solution was charged to a 250 ml, 3-necked, round-bottomed flask fitted with thermometer, argon inlet, rubber septum, and magnetic stirrer, followed by 38 ml of methyl methacrylate (previously purified by passage through a column of neutral alumina under argon) added dropwise via syringe. The addition was completed in 20 minutes, and an exotherm to 60° C. was observed. Addition of another 0.1 ml of TASHF$_2$ solution resulted in a highly exothermic reaction and a further rise in temperature to 75° C.

Twenty ml of distilled THF was added and the solution cooled to 25° C. After an hour, addition of another 0.1 ml TASHF$_2$ solution gave only a slight exotherm. In another hour, after a final 0.1 ml TASHF$_2$ solution gave no exotherm, the solution was cooled to 2° C. in an ice bath and 16.35 ml of a 0.208 M THF solution of p-xylylene dibromide was added over 20 minutes, followed by 9.02 ml of a 0.754 M acetonitrile solution of tris(dimethylamino) sulfonium difluoro trimethyl silicate. After stirring for 1½ hour, the mixture was warmed to 25° C., diluted with 20 ml methanol, and heated under reflux for one hour. The solvent was evaporated and the residue dissolved in acetone. The polymer solution was added to water and the precipitate collected by filtration and air dried. After drying in a vacuum oven at 75° C. overnight, there was obtained 37.1 g of polymethylmethacrylate diamine as a white powder.

Theoretical yield=37.2 g (99.7%)

Gel permeation chromatography gave the following data: $M_n=4,580$ $M_w=10,795$ $D=2.36$ Theoretical MW was 11,000; titrated MW (bromphenol blue end point) was 16,090.

This example is based on a synthetic method described in U.S. Pat. No. 4,414,372.

EXAMPLE 3

Illustrating the preparation of alpha, omega-bis(dimethylamino)polyethylene oxide from a commercially available polymer A 500 ml, three-necked flask was flame dried and fitted with a mechanical stirrer and nitrogen sweep. Eighty grams (0.1 mole) hydroxy terminated polyethyleneoxide (8000 MW) available under the trade designation "Dow" E-8000, was added to the flask along with 250 g toluene. The resin was dissolved by heating with stirring, and the solution was then cooled to room temperature. Phosgene was bubbled through the polymer solution until no free hydroxy was observed by infrared spectroscopy (about 10 minutes). The reaction mixture was transferred to a one liter, 1-necked flask, and excess toluene and phosgene were removed on a rotary evaporator. The solid residue, a polymeric bis-chloroformate, was redissolved in 150 ml THF. A one liter, three-necked flask, again equipped with mechanical stirring and a nitrogen sweep, was charged with 2.3 g (10% excess) 3-dimethylamino-1-propanol, 2.6 g (10% excess) triethylamine, and 100 ml THF. The solution of the polymeric bis-chloroformate was then slowly added to the flask at room temperature with stirring.

After 60 minutes, insoluble salts were removed by filtration through filter aid, and the resulting solution was stripped of solvent on a rotary evaporator. The residue was redissolved in chloroform and washed twice with 10% aqueous sodium sulfate solution. The chloroform layer was dried over MgSO$_4$, filtered, and evaporated to dryness on a rotary evaporator, to give polyethylene oxide bisdimethylamine as a crumbly-white solid in 80% yield. The titrated molecular weight was 8,375.

EXAMPLE 4

Illustrating the preparation of the intermediate 1,4-bis(p-hydroxymethylphenoxy)butane A 1000 ml, 3-necked, round-bottomed flask fitted with thermometer, reflux condenser, nitrogen inlet, and mechanical stirrer was charged with 122.1 g p-hydroxybenzaldehyde (1.0 mole), 108 g. 1,4-dibromobutane (0.5 mole), 212 g powdered anhydrous Na$_2$CO$_3$ (2.0 moles), and 300 ml dry dimethylformamide. The mixture was stirred and heated to 130° C. for 5 hours. The reaction was cooled to room temperature, poured into one liter of ice water, and the brown precipitate filtered and washed well with water. The wet cake was then dissolved in 300 ml CHCl$_3$ and washed two times with 200 ml H$_2$O and once with 200 ml 10% HCl. The organic layer was dried (MgSO$_4$), filtered, and evaporated to dryness on a rotary evaporator to give a solid mass. The product was slurried in ether, filtered, washed with ether, and air dried, to provide 1,4-bis(p-carboxaldehydo)phenoxybutane as a light-orange crystalline solid. TLC (silica gel/EtOAc) showed only one spot. The yield was 97 g (65%).

Eighty-seven grams of the above bis-aldehyde (0.29 mole) was slurried in 250 ml of 95% EtOH in a 500 ml, three-necked, round-bottomed flask, 11.0 g NaBH$_4$ (0.29 mole) were added, and the mixture was heated under reflux with magnetic stirring. The course of the reduction was followed by periodically withdrawing a sample by pipette, precipitating the product in water, and observing the disappearance of the carbonyl peak in the IR spectrum. After six hours, the aldehyde was completely reduced, and the reaction was poured without cooling into one liter of cold water. The white solid was filtered, washed with water, and air dried. The cake was triturated in 200 ml methanol, cooled in ice and filtered, washed with cold methanol, and air dried. The white, crystalline diol had an IR and NMR spectrum in agreement, with the desired structure and was pure by TLC. The yield was 80 g (91%).

Using the general procedure of Example 4, a number of additional intermediate dibenzyl alcohols were prepared.

EXAMPLE 5

Illustrating the preparation of the intermediate N,N'-dimethyl-N,N'-di(p-hydroxymethylphenyl) urea A 500 ml, three-necked, round-bottomed flask was charged with 66.1 g ethyl-p-aminobenzoate (0.4 mole), 44.6 g triethylamine (0.44 mole), and 200 ml dry THF. The solution was stirred and cooled to 0° C., and a solution of 22 g phosgene (0.21 mole) in 100 ml dry THF was added dropwise over a half-hour period. A heavy precipitate of triethylamine hydrochloride began to form immediately. The mixture was stirred for one hour after the addition was completed and then poured into one liter of 10% HCl to give a pale-yellow solid. The crude product was filtered, washed with water, and air-dried. The damp cake was slurried in MeOH, filtered, washed with methanol, and air dried, to give 56.8 g (80%) of diphenyl urea diester as a pure-white crystalline solid. The yield was 36.4 g (59%).

The ester was hydrolyzed by dissolving in 200 ml 95% ethanol, adding 25 g of 50% NaOH, and heating under reflux for 2 hours. After pouring into 500 ml water, the clear solution was acidified with 10% HCl. The flocculent white precipitate was filtered, washed with water, and the damp cake triturated with 2-butanone. After filtration, washing with ether, and air drying, there was obtained 26.8 g of diacid (86% yield).

This material was slurried in 200 ml ethylene dichloride, and 25 g thionyl chloride was added and the mixture heated at reflux under $N_2$. The solid dissolved slowly while evolving $SO_2$ and HCl gas, until a clear-yellow solution was obtained. After two hours, HCl evolution had ceased, and the reaction was evaporated to dryness on a rotary evaporator. The resulting yellow gummy solid was slurried in hexane, filtered, and washed with hexane, to give 30.0 g (100% yield) of diacid chloride urea as a pale-yellow crystalline solid.

For reduction to diol, this product was dissolved in THF and added dropwise with stirring to a slurry of 11.2 g $NaBH_4$ (0.29 mole) in 100 ml isopropanol at 0°–5° C. After addition was completed, the solution was stirred for one hour at room temperature. Water (300 ml) was added slowly to the reaction, and the precipitate was extracted into ethyl acetate. The ethyl acetate solution was washed with three 100 ml portions of water, dried ($MgSO_4$), and stripped, to give the product N,N'-dimethyl-N,N'-di(p-hydroxymethylphenyl) urea as a light-yellow oil which would not crystallize. TLC (silica gel/EtOAc) showed the product to be quite pure.

A similar procedure was used to prepare N,N'-dimethyl-N,N'-di(p-hydroxymethylphenyl) terephthalamide as well as adipamide, starting from ethyl p-aminobenzoate and terephthaloyl chloride and adipoyl chloride, respectively. In these cases, the products were obtained as white crystalline solids after trituration with toluene and ether.

EXAMPLE 6

Illustration of the preparation of 1,4-bis(p-bromomethylphenoxy) butane

In a one liter, three-necked, round-bottomed flask a slurry of 75 g 1,4-bis(p-hydroxymethylphenoxy) butane, 250 ml chloroform, and 250 ml 48% hydrobromic acid was stirred mechanically and heated to 45° C. As the reaction proceeded, the diol slowly dissolved in the $CHCl_3$ until, after three hours, the organic layer was completely clear. In another hour, the product dibromide began to precipitate. After three more hours, the slurry was cooled to room temperature, diluted with cold water, and filtered. The crude product was washed with water and suctioned to near-dryness with air. The light-orange solid was recrystallized twice from 2-butanone, to give off-white needles of dibenzyl bromide which were pure by TLC. The yield was 75 g (70%), m.p. 138°–140° C.

EXAMPLE 7

Illustration of the preparation of N,N'-dimethyl-N,N'-bis(p-chloromethylphenyl) urea A solution of 10 g N,N'-dimethyl-N,N'-bis(p-hydroxymethylphenyl) urea in 250 ml $CHCl_3$ was stirred vigorously for two hours with 250 ml conc. HCl. The layers were separated, and the organic phase was washed with dilute HCl, dried, and stripped to give a yellow oil. Trituration with hexane caused the product to crystallize. Filtration, washing with hexane, and air drying gave 3.5 g of a fluffy-white crystalline solid which was pure by TLC, m.p. 72°–73° C.

EXAMPLE 8

Illustration of the preparation of 1,4-bis(2-methoxy-4-chloromethylphenoxy) butane A solution of 22 g 1,4-bis(2-methoxy-4-hydroxymethylphenoxy) butane in 200 ml warm $CHCl_3$ was added dropwise to a solution of 60 ml $SOCl_2$ in 100 ml $CHCl_3$. After the addition was completed, the chloroform was boiled off while replacing with heptane. When the temperature reached the boiling point of heptane (97° C.), the solution was decanted from a small amount of yellow oil and allowed to cool. Decantation from oily impurities was continued until the white crystalline product began to form. The solution was cooled, and, after crystallization was completed, the product was filtered, washed with hexane, and air dried. One more recrystallization from heptane gave a pure-white crystalline product which was one spot on TLC. The yield was 23 grams, m.p. 116°–118° C.

EXAMPLES 9–18

By the methods of Examples 6, 7, or 8, the following dibenzyl halides were prepared from the intermediate dibenzyl alcohols:

| Example Number | Compound | m.p. (°C.) |
|---|---|---|
| 9 | 1,10-bis(p-bromomethylphenoxy) decane | 94–96 |
| 10 | 1,4-bis(2-methoxy-5-bromomethyl-phenoxy)butane | 155–157 |
| 11 | diethylene glycol-bis(p-bromomethylphenyl)ether | 91–93 |
| 12 | N,N'—dimethyl-N,N'—bis(p-bromomethylphenyl)urea | 75–77 |
| 13 | 1,4-bis(2-methoxy-4-bromomethyl-phenoxy)butane | 143–145 |
| 14 | 1,10-bis(p-chloromethylphenoxy)decane | 82–83 |
| 15 | 1,4-bis(2-methoxy-5-chloromethyl-phenoxy)butane | 128–131 |
| 16 | diethylene glycol-bis(p-chloromethylphenyl)ether | 71–73 |
| 17 | N,N'—dimethyl-N,N'—bis(p-chloromethylphenyl)-terephthalamide | 213–217 |
| 18 | N,N'—dimethyl-N,N'—bis(p-chloromethyl- | 75–76 |

| Example Number | Compound | m.p. (°C.) |
|---|---|---|
| | phenyl)-adipamide | |

EXAMPLE 19

Illustration of the preparation of 1,4-bis(p-iodomethylphenoxy)-butane

A solution of 3.9 g of 1,4-bis (p-bromomethylphenoxy) butane in 50 ml 2-butanone was added to a solution of 9.7 g NaI in 100 ml 2-butanone. After an initial exothermic reaction, a golden-yellow precipitate formed. The product was filtered, washed with water, and air dried. Recrystallization from xylene gave the diiodide as a golden-yellow crystalline solid. The yield was 2.0 g.

EXAMPLE 20

Illustration of the effect of substituents on the rate of polymerization and on the ultimate molecular weight of ionene elastomers The standard procedure for the preparation of ionene elastomers is to dissolve 10.0 g of the diamine in 50 ml of dry THF, add a stoichiometric equivalent of dibenzyl halide, and heat the solution under reflux under $N_2$ with magnetic stirring until the solution becomes too viscous to stir. An antioxidant, available under the trade designation "Irganox" 1010, is dissolved (0.1 g, 1% by weight) in the syrup, which is cast into a glass petri dish and the solvent allowed to evaporate for 4–5 hours. Final drying is accomplished in a 65° C. forced air oven for 16 hours to provide clear, colorless elastomer films.

The results of a number of runs of poly THF diamines with various dibenzyl halides are presented in Table 1.

TABLE 1

| Run | Molec. Weight Diamine | Dihalide | Polym. Time | I.V.[1] (dl/0.4 g) |
|---|---|---|---|---|
| 1* | 8,000 | I~~~I | 16 hr | 1.4 |
| 2* | 8,000 | ClCH2—⌬—CH2Cl | 18 hr | 1.6 |
| 3 | 8,000 | (ClCH2—⌬(OCH3)—O~)2 | 8 hr | 2.4 |
| 4 | 8,000 | [ClCH2—⌬(OCH3)—O~]2 | 8 hr | 3.1 |
| 5 | 10,000 | (ClCH2—⌬—N(CH3)—C(=O)~)2 | 6 hr | 1.8 |
| 6 | 10,000 | (ClCH2—⌬—N(CH3)~)2C=O | 5 hr | 2.0 |
| 7* | 8,000 | BrCH2—⌬—CH2Br | 20 min | 2.8 |
| 8 | 8,000 | (BrCH2—⌬—O~)2 | 10 min | 4.7 |
| 9 | 10,000 | [(BrCH2—⌬—O~O~)]2 | 15 min | 4.2 |

TABLE 1-continued

| Run | Molec. Weight Diamine | Dihalide | Polym. Time | I.V.[1] (dl/0.4 g) |
|---|---|---|---|---|
| 10 | 8,000 | 3(ClCH$_2$—⌬(OCH$_3$)—O⌇)$_2$ : 1(BrCH$_2$—⌬—O⌇)$_2$ | 1 hr | 4.6 |
| 11 | 8,000 | (ICH$_2$—⌬—O⌇)$_2$ | 30 sec | 5.1 |
| 12 | 14,000 | (ClCH$_2$—⌬(OCH$_3$)—O⌇)$_2$ | 72 hr | 2.6 |
| 13 | 14,000 | (BrCH$_2$—⌬—O⌇)$_2$ | 30 min | 3.8 |
| 14 | 14,000 | 3(ClCH$_2$—⌬(OCH$_3$)—O⌇)$_2$ : 1(BrCH$_2$—⌬—O⌇)$_2$ | 3½ hr | 3.3 |
| 15 | 27,500 | (BrCH$_2$—⌬—O⌇)$_2$ | 1 hr | 3.0 |

*Control examples
[1]CHCl$_3$ solution, measured at 25° C. in a Cannon-Fenske #50 viscometer.

In considering the results listed in Table 1, it is apparent that electron-donating substituents on the dibenzyl halide greatly increase the rate of reaction compared to a reactive dialkyl halide or an unsubstituted dibenzyl chloride (Runs 3–6 with Runs 1 and 2). The greatest increase in rate is effected by changing the leaving group (Runs 4, 8, and 11). Even though the dibenzyl bromides had similar rates of polymerization, the presence of electron-donating substituents led to substantially higher molecular weights (Run 7 with Runs 8 and 9). Combinations of bromides with chlorides gave rate increases comparable to pure bromides (Runs 3 and 8 with Run 10; and Runs 12 and 13 with Run 14).

EXAMPLE 21

Illustrating the excellent elastomeric properties exhibited by the ionenes prepared according to Example 20

Table 2 lists the tensile properties of a number of representative poly THF ionene elastomers and several ionene block copolymer elastomers as measured on a tensile testing device available under the trade designation "Instron" Model 1125 at a crosshead speed of 500 mm/min with a 500 kg load according to ASTM D412.

TABLE 2

| pTHF Diamine MW (%) | Copolymer (%) | Dihalide Example (X) | Tensile (kPa) | Elongation (%) | 100% Modulus (kPa) | 300% Modulus (kPa) |
|---|---|---|---|---|---|---|
| 1 7350 | | 8 (Cl) | 35,060 | 1,100 | 1520 | 1900 |
| 2 8500 | | 8 (Cl) | 29,370 | 1,000 | 1590 | 2210 |

TABLE 2-continued

| pTHF Diamine MW (%) | Copolymer (%) | Dihalide Example (X) | Tensile (kPa) | Elongation (%) | 100% Modulus (kPa) | 300% Modulus (kPa) |
|---|---|---|---|---|---|---|
| 3 10,000 | | 7 (Cl) | 38,540 | 760 | 1210 | 1650 |
| 4 10,000 | | 6 (Br) | 33,920 | 650 | 1590 | 2070 |
| 5 10,000 (80) | Poly EO (20) | 6 (Br) | 47,570 | 590 | — | 8140 |
| 6 10,000 (80) | Poly MMA (20) | 6 (Br) | 42,260 | 610 | 2830 | 9170 |

EXAMPLE 22

Illustrating the effect of substituents on the "melting" (depolymerization) points of poly THF ionene elastomers In this study, a number of elastomer film samples were heated in a testing device available under the trade designation "Thermo Mechanical Analyzer" at a rate of 10°/min, and the "melting" (depolymerization) point was taken as the temperature at the midpoint measured from the onset of the softening to complete penetration of the probe. Results for a series of poly THF ionene elastomers obtained from various dibenzyl halides are shown in Table 3.

TABLE 3

| Run | pTHF Diamine MW | Dihalide (Example) | M.P. (°C.) |
|---|---|---|---|
| 1 | 8,000 | 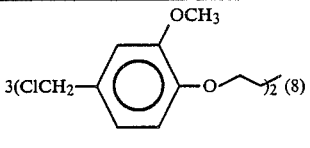 + 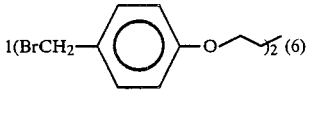 | 144° |
| 2 | 8,000 | 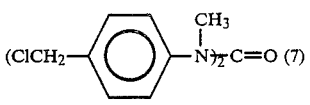 | 146° |
| 3 | 10,000 | 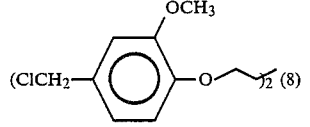 | 147° |
| 4 | 14,000 |  | 149° |
| 5 | 8,000 | 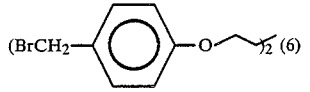 | 157° |
| 6 | 8,000 | 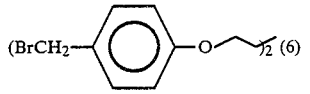 | 157° |
| 7 | 14,000 | 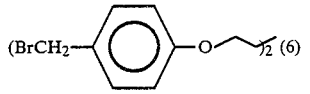 | 160° |
| 8 | 8,000 |  | 179° |

From these results it can be concluded that the "melting" points of these elastomers are dependent on the substituents of the dibenzyl halides and not on the molecular weight of the amine fragment (Runs 2 and 4 with Runs 6 and 7). Bromides are higher "melting" than chlorides (Runs 6–8 with Runs 1–5). Electron-donating substituents promote a lowering of the "melting" point compared to unactivated dibenzyl halides (Runs 2–4 with Run 5, and Runs 6 and 7 with Run 8). The "melting" point of a mixture of dibenzyl chloride and bromide is approximately the same as that of a pure chloride (Run 1 with Runs 2–4).

EXAMPLE 23

Illustrating that the "melting" of ionene elastomers of this invention is a depolymerization, and also illustrating how the melts repolymerize in time In this study, samples of solid elastomer films were heated (in vessels in an oil bath heated to the specified temperature and preferably under N₂) for the minimum amount of time required for the film to become fluid (usually 10–15 minutes). A sample of the gum or syrup was immediately dissolved in CHCl₃ for determination of the inherent viscosity of the melt. The remainder was placed in a 65° C. oven and periodically sampled to determine changes in viscosity with time, if any. Results are shown in Table 4.

TABLE 4

Melt Behavior of Ionene Elastomers

Inherent Viscosity (dl/0.4 g) in CHCl₃

Ionene 1:

TABLE 4-continued
Melt Behavior of Ionene Elastomers

Inherent Viscosity
(dl/0.4 g) in CHCl$_3$

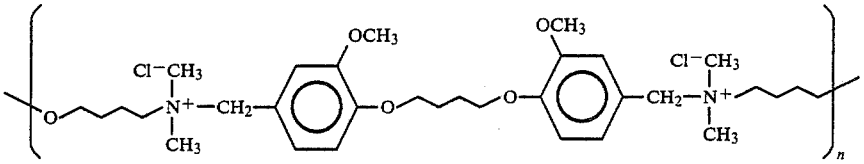

| | |
|---|---|
| Original Elastomer | 2.37 |
| Melt (145° C., 10 min) | 0.88 |
| 2 hr (65° C.) | 1.26 |
| 18 hr (65° C.) | 2.19 |
| 42 hr (65° C.) | 2.27 |

Ionene 2:

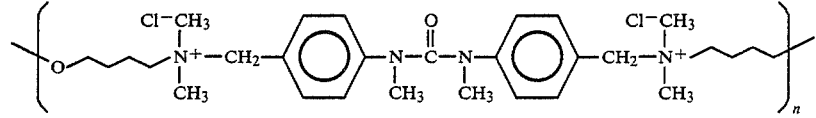

| | |
|---|---|
| Original Elastomer | 1.95 |
| Melt (140° C., 15 min) | 1.17 |
| 18 hr (65° C.) | 1.69 |

Ionene 3;

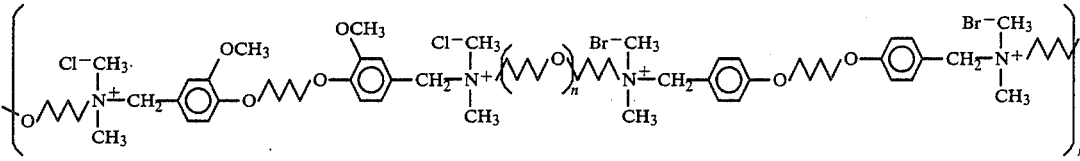

Cl:Br = 3:1

| | |
|---|---|
| Original Elastomer | 3.22 |
| Melt (145° C., 7 min) | 1.00 |
| 18 hr (65° C.) | 2.21 |

Even though the molten syrups resolidify to strong elastomers shortly after cooling to room temperature, it is seen from the I.V. data of the Table that the actual molecular weight is slow to build in the solid state even with annealing at 65° C. However, in time the ionenes do recover at least 70–95% of their initial molecular weight.

polyester film, allowing the solvent to evaporate for 20 minutes at room temperature and then for 10 minutes in a 65° C. oven. After aging at 20° C. for 18 hours, conventional testing procedures were employed to determine peel adhesion to glass and shear adhesion at 20° C. and at 65° C. Results are reported below, along with detailed descriptions of the test methods utilized.

| | Adhesive Thickness (mm) | Peel Adhesion Glass (N/100 mm) | Shear (20° C.) 1 kg (min.) | Shear (65° C.) 1 kg (min.) |
|---|---|---|---|---|
| 100 phr | 0.02 | 61 | 10,000+ | 200 |
| 120 phr | 0.02 | 74 | 10,000+ | 100 |

EXAMPLE 24

Illustrating the preparation of a pressure sensitive adhesive composition from an ionene elastomer and a tackifying resin An ionene elastomer prepared from α,ω-bis(dimethylamino)polytetramethylene oxide of 10,000 MW and 1,4-bis(2-methoxy-5-chloromethylphenoxy) butane (IV=2.34) was blended with an α-pinenephenol tackifying resin. A 100 phr sample was prepared by dissolving 4.0 g of the elastomer and 4.0 g of tackifying resin in a 32.0 g of CHCl$_3$ and a 120 phr sample consisted of 4.0 g elastomer and 4.8 g tackifier resin in 35.2 g of CHCl$_3$. Each of these compositions was cast on Almost identical results were obtained using a rosin ester tackifying resin available under the trade designation "Foral" 85.

TEST METHODS

The test methods used to evaluate the psa-coated flexible sheet materials of the above example are industry standard tests. The standard tests are described in detail in various publications of the American Society for Testing and Materials (ASTM), Philadelphia, Pennsylvania and the Pressure Sensitive Tape Council (PSTC), Glenview, Illinois.

Shear Strength

(Reference: ASTM: D3654-78; PSTC-7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive-coated sheet material from a stainless steel test panel under stress of a constant, standard load.

The tests were conducted on adhesive-coated strips applied to a stainless steel panel such that a 12.5 mm by 12.5 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces thus insuring that only the shear forces are measured in an attempt to more accurately determine the holding power of the tape being tested. The time elapsed for each tape example to separate from the test panel is recorded as the shear strength.

Peel Adhesion

Reference: ASTM D3330-78 PSTC-1 (11/75)

Peel adhesion is the force required to remove a coated flexible sheet material from a test panel measured at a specific angle and rate of removal. In the example, this force is expressed in Newtons per 100 mm (N/100 mm) width of coated sheet. The procedure followed is:

1. A 12.5 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself so the angle of removal will be 180°. The free end is attached to the adhesion tester scale.
3. The glass test plate is clamped in the jaws of a tensile testing machine which is capable of moving the plate away from the scale at a constant rate of 2.3 meters per minute.
4. The scale reading in Newtons is recorded as the tape is peeled from the glass surface. The data is reported as the average value of the range of numbers observed during the test.

We claim:

1. A pressure sensitive adhesive composition comprising the ionene elastomer repeating units represented by the formula:

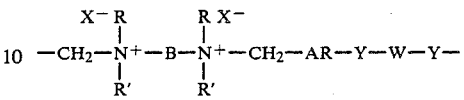

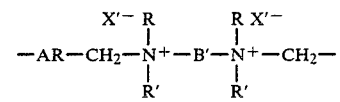

Wherein:
R is a lower alkyl group of 1 to 4 carbon atoms;
R' is a lower alkyl group of 1 to 4 carbon atoms wherein R' may be the same as or different from R, and R' and R may be joined together with or without an additional hetero atom to form a heterocyclic ring;
X is a halogen selected from the group consisting of Cl, Br, and I;
X' is a halogen selected from the group consisting of Cl, Br, and I and can be the same as or different from X;
B is a divalent polymeric moiety having a molecular weight of about 1,000 to about 50,000;
B' is a divalent polymeric moiety having a molecular weight of about 1,000 to about 50,000 and may be the same as or different from B but, if B and B' are different, at least one of B or B' has a $T_g$ of less than 20° C.;
AR is a phenylene or substituted phenylene radical;
Y is a divalent electron-donating sustituent; and
W is a divalent radical selected from the group consisting of (1) a $C_{2-12}$ alkylene selected from the group consisting of saturated $C_{2-12}$ alkylene, $C_{2-12}$ alkylene with one double bond, $C_{2-12}$ alkylene with more than one double bond and $C_{2-12}$ alkylene with a triple bond, (2) $-(CH_2CH_2O)_2-CH_2CH_2-$ when Y is oxygen or sulfur and (3) carbonyl, terephthaloyl, or adipoyl when Y is nitrogen and sufficient compatible tackifier to endow the composition with a degree of adhesive tack to provide a pressure sensitive adhesive.

2. The pressure sensitive adhesive composition of claim 1 wherein the weight ratio of tackifier to the ionene elastomer is in the range of about 50:100 to about 150:100.

* * * * *